July 11, 1967 L. G. HORWITT 3,330,937
ELECTRIC CIGAR LIGHTER
Filed July 22, 1965 2 Sheets-Sheet 1
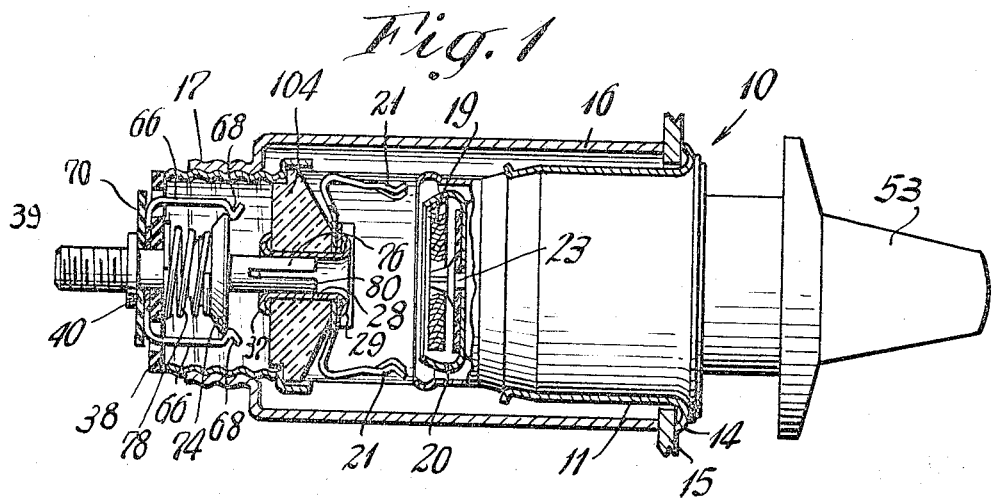
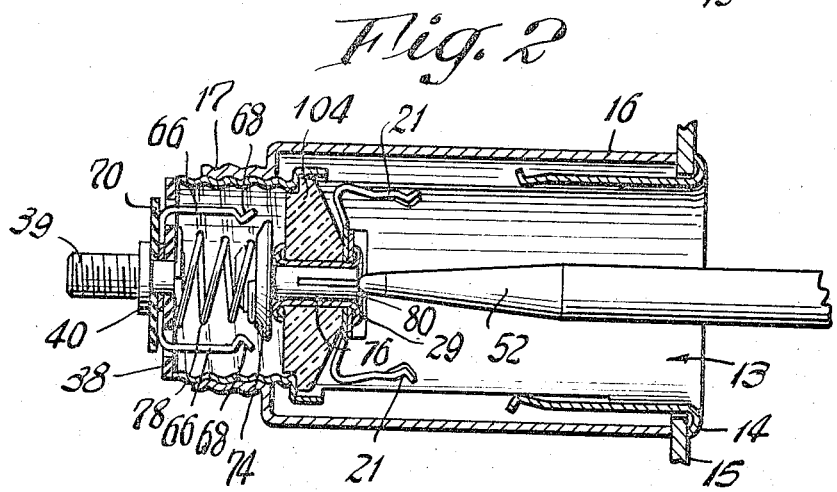
INVENTOR.
Laurence G. Horwitt
BY
Johnson and Kline
ATTORNEYS

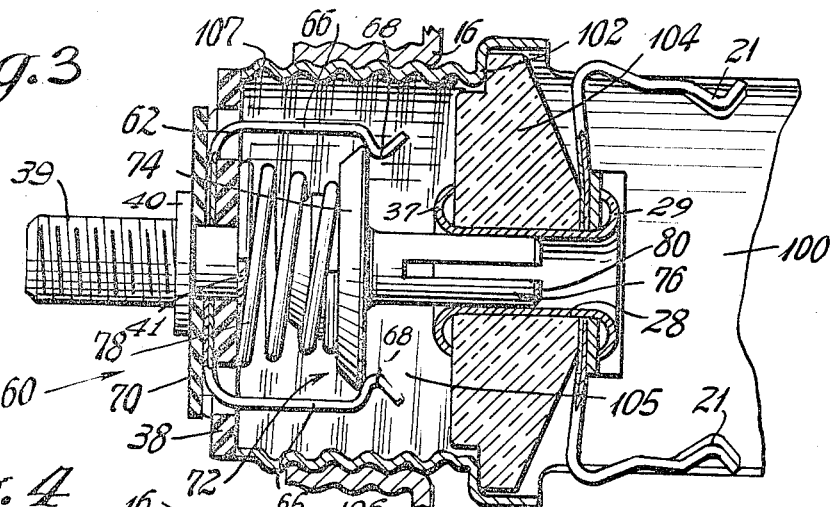
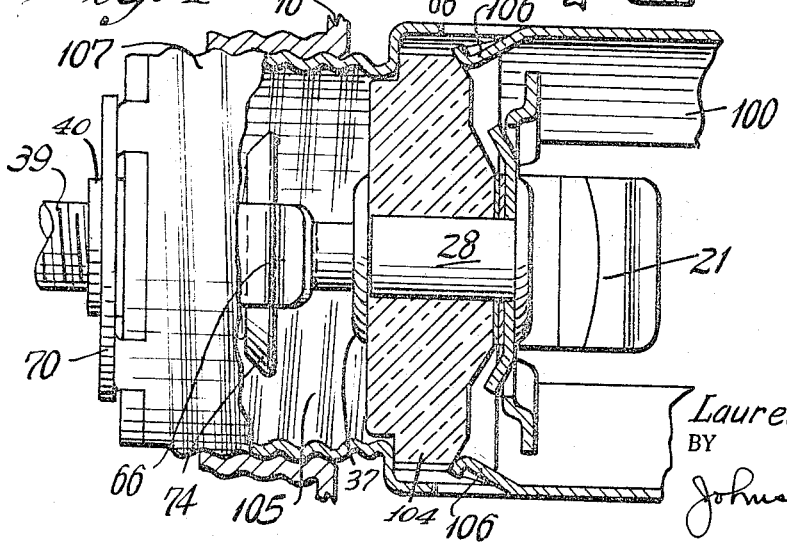

United States Patent Office 3,330,937
Patented July 11, 1967

3,330,937
ELECTRIC CIGAR LIGHTER
Laurence G. Horwitt, New Haven, Conn., assignor to Casco Products Corporation, Bridgeport, Conn., a corporation of Connecticut
Filed July 22, 1965, Ser. No. 473,990
3 Claims. (Cl. 219—265)

ABSTRACT OF THE DISCLOSURE

A thermostatically controlled electric cigar lighter having an igniter plug which is mounted in a holder to be removed for use is provided with a short-circuit or overload cut-out switch which is located in a chamber at the inner end of the holder and has heat-responsive contact fingers normally engaging a conducting member which disengage the latter when excessively heated to open the circuit to the plug, and a member accessible through the open end of the holder, when the plug is removed, for manually resetting the circuit breaker.

This invention relates to electrical cigar lighters of the removable ignition type and more particularly to such cigar lighters having improved resettable circuit breaking means.

Heretofore it has been proposed to provide cigar lighters of the type referred to with safety devices such as fuses and circuit breakers which cause the circuit leading to the igniting unit from a battery or other source of supply to be opened if the device becomes heated to a dangerous degree by some malfunctioning of the lighter, a short circuit or the like.

Such safety devices such as fuses have been mounted on the cigar lighter for removal and replacement after the fault has been corrected, but this involves considerable annoyance and some cost. Other safety devices have been of the heat-responsive automatically resettable type which repeatedly open, reclose and open the circuit until the fault is removed after which they then reclose the circuit. The continued reclosing and opening of the circuit if it continues unnoticed for any considerable time places a severe drain on the battery of the motor vehicle and can result in the complete discharge of the battery.

Another type of safety device provides for opening the circuit in case of a fault and keeping it open until reset manually. However, as heretofore proposed, such devices could only be reset when attached to a cigar lighter mounted on the instrument panel by reaching up around the lower edge of the instrument panel to gain access to the back end of the lighter, if in fact the safety device could be reached in that way. Otherwise, the lighter would have to be removed from the instrument panel, as it would in the case of the lighters mounted elsewhere in the vehicle.

Another disadvantage of the safety devices of cigar lighters as heretofore provided is that when the circuit was opened there was nothing to indicate that fact except that the igniter would not be heated for use, and whether or not a fault existed or whether the heating element was burned out could not be determined until the heating element was examined and tested.

An object of this invention is, therefore, to provide a cigar lighter with an improved manually resettable circuit breaker having means which is accessible to be operated to reset the circuit breaker through the open end of the holder for the removable igniting unit when the latter is removed from the holder, thus avoiding the difficulties of reaching the reset means to reset the device.

Other features and advantages will hereinafter appear.
In the accompanying drawings:
FIGURE 1 is a longitudinal cross section of a cigar lighter embodying the present invention with part of the igniter shown in elevation, the circuit breaker being shown in closed circuit position.

FIG. 2 is a sectional view of the holder with the igniter removed showing the circuit breaker in the act of being reset by an instrument such as a tapered wooden stick extending into the open end of the holder.

FIGS. 3 and 4 are enlarged views showing the circuit breaker at the inner end of the holder.

In the drawings, the cigar lighter shown is of the type having an igniting unit 10 which is removably mounted on a holder 100 which is in the form of a hollow tube having an open end 13 provided with a flange 14. The holder 11 is usually inserted in a hole in the instrument panel 15 where it is held by a clamping sleeve 16 having a threaded neck 17 engaging threads 107 on the inner end of the holder by which the outer end of the sleeve is forced against the inner surface of the panel 15 and the flange 14 of the holder is forced against the outer surface of the panel.

The igniting unit has a heating element 19 comprising a spiral coil of resistance wire mounted in a contact cup 20 to which one end of the wire is connected.

When the igniting unit is to be energized the contact cup 20 is caused to engage bimetallic contact fingers 21 carried by an insulating block 22 in the bottom of the holder. Usually the contact fingers 21 are secured to the block 22 by a terminal which is connectible to the live leg of the battery or other source of current. The other leg of the battery being grounded, the circuit to the heating element wire is completed through the chassis of the vehicle, the panel 15, holder 11, igniter 10 to the post 23 of the heating element through the latter to the cup 20 and contact fingers 21 back to the battery.

According to the present invention the contact fingers 21 are connected to the live leg of the battery by a circuit breaker indicated generally by the reference number 60.

In the form of my invention illustrated, the holder and circuit breaker housing are constructed as an integral unit in which the holder 100 is formed intermediate its end with an annular shoulder 102 which supports an insulating block 104 which in turn is a support means for the contact fingers 21, for the removable igniting unit. The block 104 is secured in place by lances 106 (see FIG. 4) struck inwardly from the side wall of the holder 100. The block 104 is disposed in spaced relationship with the disk 38, which now becomes the bottom wall of the holder 100, so that there is a chamber 105 within the holder 100 between the disk 38 and the block 104, the chamber being enclosed by the threaded extension 107 of the holder.

In the cigar lighter illustrated, when the heating element 19 is to be energized the knob 53 is pressed inwardly causing the contact cup 20 to engage the bimetallic contact fingers 21 and is held in that position until the heating element 19 becomes sufficiently hot for use, whereupon the bimetallic fingers 21 yield and permit the igniting unit with the cup 20 to return to open circuit position by spring means contained within the igniting unit in a manner well known in the art. It is the operation of the bimetallic fingers 21 which controls the normal closing and opening of the circuit to the heating element. If the heating element is released properly by the bimetallic fingers, as soon as it becomes sufficiently hot for use insufficient heat will be transmitted to the circuit breaker which will remain in closed circuit position. However, if the contacts 21 fail to release the contact cup 20 or if the igniting unit is held in by hand or otherwise, excessive heat will be transmitted through the metallic parts to the circuit breaker causing it to open the circuit.

The same operations will occur if the circuit breaker becomes overheated by the current passing through it which would occur when a short circuit exists between the current carrying contacts 21 and the grounded holder 11.

In the embodiment of the invention illustrated herein the circuit breaker 60 is disposed in a chamber 105.

The circuit breaker 60 comprises a substantially U-shaped resilient metal contact member 62 having a centrally apertured bottom 64 and a pair of opposed latch fingers 66 each terminating in a latch portion 68. The contact member 62 is bimetallic and biased to have the fingers move radially outwardly and spread apart, when it is exposed to excessive heat, either from an overheated heating element or as the result of high current passing through the contact member caused by a short circuit. The contact member is mounted on the outer surface of the disk 38 and secured thereto by an insulating cover disk 70, this assembly being secured together by the spun-over end 41 of the stud 39 cooperating with the stud flange 40.

In order to normally complete a circuit from the stud 39 to the eyelet 28 to which the bimetallic contact fingers 21 in the holder are connected, there is provided an axially movable conductor 72 having a disk portion 74 which is normally engaged by the latch portions 68 of the conductor member 62, and a plunger portion 76 which is received within the eyelet 28. The plunger portion is bifurcated and the legs thereof are biased slightly apart in order to make good electrical contact with the interior surface of the eyelet 28.

A compression spring 78 is interposed between the disk 38 and the movable conductor disk portion 74 to urge the conductor to an open circuit position shown in dotted lines in FIG. 4 when the latch fingers 66 are spread apart in response to excessive heat.

The plunger portion 76 of the movable conductor is accessible through the cavity of the holder 11 and through the eyelet 28 for engagement with a tool or other instrument for resetting the circuit breaker from an open circuit position to a closed circuit position in substantially the same manner as that illustrated in FIG. 2.

In addition, the plunger portion 76 is made of sufficient length so that its outer end 80 is visible through the cavity and the eyelet 28, and the proximity of the end 80 to the outer end 29 of the eyelet 28 is an indication that the circuit breaker is in open circuit position.

If, in the operation of the cigar lighter, due to some fault, for instance, a short circuit or improper operation, excessive heat is produced by the heating element 19, the heat is transferred through the eyelet 28, the plunger 80 and the disk 74 to the contact arms 66. The arms 66 being made of bimetal, when they become heated they move radially outwardly so that the hook portion 68 will move away from the edge of the disk 74. When this happens, due to the operation of a spring 78, the plunger moves to the position shown in FIG. 2, thus breaking the circuit between the contact arms 66 and disk 74. Thus, the circuit to the heating element is broken and will remain broken until the plunger 76 is operated to move the disk 32 to the position shown in FIG. 1. The same operations occur if, as shown in FIG. 1, a short circuit causes the current in the contact arms 66 to overheat them.

As pointed out above, the present invention provides a cigar lighter having a manually resettable circuit breaker which can be reset from the open end of the holder 11. To accomplish this, the plunger 76 is made of such length that its end 80 may be engaged for operation by means of an implement such as the pointed stick of wood 52 shown in FIG. 2 which may enter the eyelet 28 and be applied to the plunger so as to force the plunger inwardly of the chamber to permit the hooked ends 68 of the spring contact arm 66 to engage and retain the disk 74 in closed circuit position. This resetting operation is performed, of course, after the igniter is removed from the holder, and particularly the bimetallic spring contact 66, has had an opportunity to cool off. Should the plunger be operated before this or while the fault or short circuit still exists, it will immediately return to the position shown in FIG. 2.

In order to indicate that the circuit has been broken, the plunger 80 is of such length that when it is in its open circuit position it can be seen prominently near the end of the eyelet by looking into the holder 11, while in its normal circuit closing position it can be observed as deep in the eyelet.

Variations and modifications may be made within the scope of the claims and portions of the improvements may be used without others.

I claim:

1. In an electric cigar lighter having an elongate holder having a cavity for supporting an igniting unit for removal and replacement therein through an open end of the holder, and support means in the holder; heat responsive electric contact means in said holder including means mounted on said support means adapted to engage the inner end of the igniting unit for completing an electric circuit from a source of current supply to the igniting unit when the latter is to be energized and for opening said circuit when the igniting unit reaches normal operating temperature for use, the improvement comprising a normally closed heat-responsive circuit breaker in said electric circuit between said source of current supply and said contact means in the holder, said circuit breaker normally maintaining said circuit closed but responsive to heat substantially in excess of said normal operating temperature to open the circuit to said contact means, means accessible through the open end of the holder when the igniting unit is removed from the holder for manually resetting the circuit breaker, said holder having a bottom wall and said support means comprising an intermediate wall mounted in the holder in spaced relation with the bottom wall to define a chamber therebetween, said circuit breaker being disposed in said chamber, the intermediate wall being a centrally apertured block of insulating material fixedly secured in the holder, and the circuit breaker including a resilient metal contact member having at least one finger terminating in a latch portion, and an axially movable conductor member having a portion engageable by said latch portion and a plunger portion projecting into said aperture, one of said members being electrically connected to said contact means in the holder and the other to the source of current, said contact member being bimetallic and biased to move radially outwardly to release said conductor member when exposed to excessive heat, and spring means for moving said conductor member to an open circuit position when released by said latch portion.

2. A cigar lighter according to claim 1 wherein the end of the plunger portion of said conductor is accessible through the cavity of the holder and the aperture of the intermediate wall for engagement with a hand-held means to move the conductor to a position of re-engagement with said latch portion of said finger to be held thereby in closed circuit position.

3. A cigar lighter according to claim 1 wherein the end of the plunger portion is visible through the cavity of the holder and the aperture of the intermediate wall, and is of such a length relative to the length of the aperture that its proximity to the outer surface of the intermediate wall indicates that the conductor is in open circuit position.

References Cited

UNITED STATES PATENTS

| | | | |
|---|---|---|---|
| 2,084,966 | 6/1937 | Ashton | 219—263 |
| 2,140,311 | 12/1938 | Cohen | 219—264 |
| 2,248,407 | 7/1941 | Johnson | 219—263 |
| 2,262,483 | 11/1941 | Ashton | 219—264 |
| 2,704,318 | 3/1955 | Jorgensen et al. | 219—264 |
| 2,848,590 | 8/1958 | Ashton et al. | 219—264 |
| 2,858,409 | 10/1958 | Dening | 219—264 |
| 3,238,353 | 3/1966 | Lybrook | 219—265 |

RICHARD M. WOOD, *Primary Examiner.*

V. Y. MAYEWSKY, *Assistant Examiner.*